Figure 1:
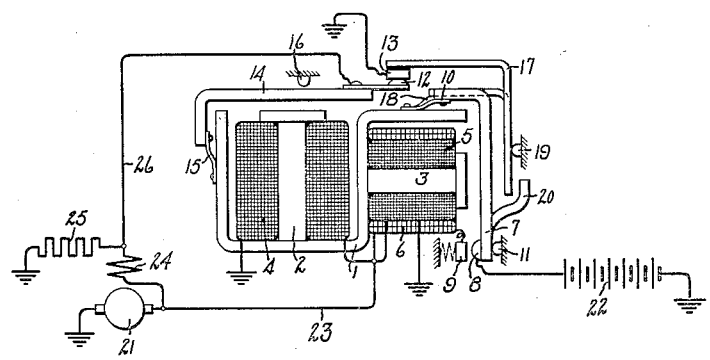

March 3, 1936.    L. W. THOMPSON ET AL    2,033,014

ELECTRICAL REGULATION

Original Filed May 2, 1934

Inventors:
Louis W. Thompson,
Bernard M. Cain,
by Harry E. Dunham
Their Attorney.

Patented Mar. 3, 1936

2,033,014

UNITED STATES PATENT OFFICE 2,033,014

ELECTRICAL REGULATION

Louis W. Thompson, Schenectady, and Bernard M. Cain, Ballston Lake, N. Y., assignors to General Electric Company, a corporation of New York Application May 2, 1934, Serial No. 723,543
Renewed October 29, 1935

5 Claims. (Cl. 171—313)

Our invention relates to electrical regulation and more particularly to a novel electro-magnetically operated circuit controlling structure adaptable for use as a combined current-limited voltage regulator and reverse current cut-out.

Still more particularly our invention is a novel combination of the inventions disclosed and broadly claimed, respectively, in L. W. Thompson application, Serial No. 723,541 and B. M. Cain application, Serial No. 723,542, both of which applications were filed on May 2, 1934, and both of which are assigned to the assignee of the present application. The Thompson application relates to a novel current-limited vibratory contact type automatic voltage regulator whose essential operating principle is that, within the normal current range, one of a pair of cooperable contacts is vibrated by a voltage element with respect to the other contact, which remains stationary, in such a manner as to maintain constant voltage, while during abnormal current conditions the normally stationary contact is vibrated with respect to the normally vibratory contact, which then is stationary, in such a manner as to limit the current to a predetermined maximum value. The Cain application relates to a novel electrical regulating system in which a conventional voltage regulator has associated therewith a combined current limiting device and cut-out and the operation is such that the cut-out responds to a predetermined maximum allowable current value for recalibrating the voltage regulator so as to cause it to hold a minimum voltage during excess current conditions, whereby the current will automatically be limited to the maximum allowable value.

In accordance with our present invention, we so combine the above described features of our respective sole inventions that the cut-out introduces the current limiting feature in the manner of the Thompson invention thereby eliminating the necessity for additional elements, such as resistors and windings which are needed for the recalibrating operation in the Cain invention, while at the same time eliminating the necessity for two current windings, as is necessary in the Thompson invention when it is employed in conjunction with a conventional cut-out. In our invention we produce, by the use of but a single current winding, two potential windings, and but two pairs of contacts, a construction which acts as a vibratory contact voltage regulator up to a predetermined current value and which automatically limits the current to this particular maximum value and which also includes the function of the conventional cut-out or reverse current relay.

Although our invention is in no sense limited thereto, the particular circuit, in which we at present contemplate using it, is the usual battery charging circuit for motor vehicles. Motor vehicles require a storage battery for operating the lights and ignition and the starting motor when the engine is at rest and in order to charge this storage battery an engine driven generator is employed. In such circuits it is necessary to have a reverse current relay or cut-out for preventing the battery from discharging through the generator when it is at rest and in a constant potential charging system it is desirable to have automatic current limiting means for preventing overloading of the generator due to a badly discharged battery or for any other cause, such as from short circuits or the application of excessive additional load to the generator.

An object of our invention is to provide a new and useful electro-magnetically operated circuit controlling structure.

Another object of our invention is to provide a novel combined current limited voltage regulator and cut-out.

Our invention will be better understood from the following description taken in connection with the accompanying drawing, and its scope will be pointed out in the appended claims.

Figure 2:
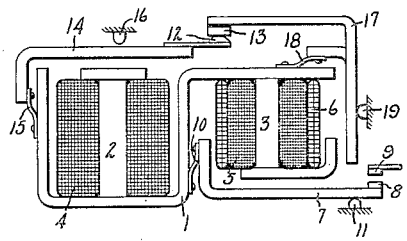

In the drawing, Fig. 1 is a diagrammatic showing of an embodiment of our invention as applied to a direct current generator for charging a storage battery and Fig. 2 shows a modified form of our invention.

Referring now to Fig. 1, we have shown therein our invention as comprising a pair of electromagnets in the form of a unitary magnetic structure 1, having two separate magnetic circuits 2 and 3, respectively, upon each of which is mounted a separate potential winding 4 and 5, respectively. In addition, the magnetic circuit 3 has a current winding 6.

At this point it should be stated that it is not essential to our invention that the two electromagnets, or magnetic circuits, be combined in the form of a unitary magnetic structure, and in principle our invention operates equally well with entirely magnetically separate electromagnets. However, the unitary structure is more compact and rugged and is less expensive to make and for these reasons it is preferable to the use of entirely magnetically separate magnets.

Associated with the magnet having the magnetic circuit 3 is an armature member 7 carrying a contact 8 for cooperation with a resiliently mounted contact 9. Contacts 8 and 9 serve as the reverse current relay or cut-out contacts. Armature 7 is movably mounted in any suitable manner and is biased away from contact 9 in any suitable manner, such as by mounting it on a spring member 10. A stop member 11 is preferably provided for limiting the motion of contact 8 away from contact 9. From the above described construction it will be seen that contacts 8 and 9 are adapted to be controlled by the magnet having the magnetic circuit 3 and the potential and current windings 5 and 6, respectively, and the arrangement is such that when the pull of this magnet, that is to say, when the total flux or magnetization produced by the two windings thereon exceeds a predetermined minimum value, the armature 7 will be attracted to the magnet thereby causing contact 8 to move into engagement with contact 9.

In addition to the cut-out contacts 8 and 9 a pair of vibratory regulator contacts 12 and 13 are provided and the arrangement is such that contact 12 is controlled solely in accordance with the magnetization or flux of the magnet having the magnetic circuit 2 and the potential winding 4, and contact 13 is controlled solely in accordance with the magnetization or flux of the magnet having the magnetic circuit 3 and the potential and current windings 5 and 6, respectively. In addition, contacts 12 and 13 are biased toward each other and the bias of contact 13 toward contact 12 is stronger than the bias of contact 12 toward contact 13. As shown, contact 12 is mounted on an armature member 14, which in turn is movably mounted on a biasing and supporting spring 15 which serves to urge the armature 14 away from the magnet whereby contact 12 is urged toward contact 13. If desired, a suitable stop member 16 for the armature 14 may be provided. Contact 13 is mounted on a movable member 17 by means of a spring member 18 which is placed alongside the spring member 10 and which is shown more clearly in Fig. 2. This spring member serves to bias the contact 13 toward the contact 12 and a suitable stop 19 is provided for limiting the motion of contact 13 toward contact 12, as the bias of contact 13 is stronger than the bias of contact 12.

The motion of member 17 is controlled by means of a latch or hook member 20, carried by the armature 7 and constructed so as to engage the end of member 17. With this arrangement when the total flux or magnetization of the magnetic circuit 3 exceeds a predetermined maximum value, the pull on armature 7 will be so great as to cause the resiliently mounted contact 9 to yield inwardly so that the latch member 20 engages the member 17 whereby the contact 13 is moved away from the contact 12 and due either to the inherent characteristics of the spring 15, or to the stop 16, the follow up motion of contact 12 with respect to contact 13 is limited, so that at values of magnetization of magnetic circuit 3 above the predetermined maximum value, the contact 13 will move out of engagement with the contact 12.

Similarly, when the magnetization of the magnetic circuit 2 exceeds a predetermined maximum value, the pull on armature 14 causes contact 12 to disengage contact 13, which latter contact is prevented from any follow up motion by the means of the stop 19.

Contact 12 is normally a vibratory contact with respect to contact 13, which is normally stationary, and the magnetic circuit having the potential winding 4 comprises the voltage responsive operating magnet of the voltage regulator portion of our invention. Contact 13, when moved away from contact 12, acts in a vibratory manner, contact 12 then being stationary and this operation corresponds to the current limit action of our invention and takes place when the energization of the magnetic circuit 3 exceeds a predetermined maximum value corresponding to an excess current. Consequently, contacts 12 and 13 are the regulator contacts. As previously stated, the separably biased contacts 8 and 9 form the reverse current cut-out contacts, so that the magnetic circuit 3, having the potential and current windings 5 and 6, which magnetic circuit controls the contacts 8 and 9 and the contact 13, comprises a construction resulting in a combined cut-out and current limit arrangement.

For illustrating a particular application of our invention, it is shown in Fig. 1 as applied to a direct current generator 21, which is connected to charge a storage battery 22 by means of a circuit 23 including in series the current winding 6 and the contacts 8 and 9. As shown, this circuit has a ground return. Generator 21 is provided with a shunt field winding 24 having in series therewith a regulating resistor 25. By means of a conductor 26 the contacts 12 and 13 are connected so as to short-circuit the resistor 25 when these contacts are in engagement. In addition, the two potential windings 4 and 5 are connected to respond to the voltage of the circuit 23 and as shown these windings are each connected between the conductor 23 and ground.

The operation of the system shown in Fig. 1 is as follows: With the various parts in the positions they are shown in the drawing the entire system may be considered as being at rest or deenergized. Assume now that generator 21 is started and is being brought up to speed by any suitable source of rotation (not shown), such for example, as an automobile engine. Due to the fact that the contacts 12 and 13 are short-circuiting the resistor 25 the resistance of the shunt field circuit of the generator is a minimum and consequently maximum field current tends to flow through this winding for any given voltage. Consequently, the voltage of generator 21 builds up rapidly, thereby causing the energization of potential windings 4 and 5, which energization, of course, increases in proportion to the increase in generator voltage. Winding 5 is so designed with respect to the biasing force of spring 10 that as soon as the generator voltage exceeds the normal counter-voltage of the battery 22, the armature 7 will be attracted whereby contact 8 engages contact 9. This completes a battery charging circuit through these contacts and this circuit includes the current winding 6. Winding 6 is so wound, or connected, that it acts cumulatively with respect to potential winding 5, so that the normal charging current increases the magnetization, or flux, in magnetic circuit 3, whereby the contacts 8 and 9 are held firmly in engagement. If the voltage of generator 21 continues to increase, it will attain a value which it is desired to maintain substantially constant for proper battery charging. Winding 4 is so designed in relation to the bias of spring 15 that when this particular normal value of voltage is attained the armature 14 will be attracted to the voltage magnet, thereby causing contact 12 to disengage contact 13 whereby the resistance 25 is inserted in circuit with the field winding 24 thereby reducing the current in this winding and decreasing the voltage of generator 21. As soon, however, as the voltage decreases below the normal value spring 15 overcomes the pull of the voltage magnet thereby causing the contact 12 to re-engage the contact 13 whereby the resistor 25 is short-circuited and the voltage of generator 21 again increases. This results in a relatively rapid vibratory motion of contact 12 into and out of engagement with contact 13 with the result that the field current is held at various average values depending upon the speed and load on the generator 21, which values are such as to maintain constant generator voltage at these various speeds and loads.

If now the current in the circuit 23 continues to increase the combined pull, or total flux, produced by the potential winding 5 and the current winding 6 will be such as to cause the armature 7 to press the contact 8 against the contact 9 with such force that the resilient support of the contact 9 yields so that the armature 7 is gradually attracted toward the core of these windings. The resilient support for the contact 9 and the latch member 20 are so designed that at the particular maximum, or limiting, value of current which is permissible for the generator 21 to carry, the latch 20 engages the member 17 so that any further inward movement of the armature 7 causes the contact 13 to move away from the contact 12. However, as soon as contact 13 leaves contact 12 the resistance 25 is inserted in the field circuit of the generator 21 thereby reducing the voltage of generator 21 to a minimum value with the result that the current in the circuit 23 rapidly falls. However, as soon as this current gets below the maximum permissible value the armature 7 moves outwardly until the latch 7 disengages the member 17, whereby the member 17 engages the stop 19 and the contact 13 re-engages the contact 12. Consequently, whenever conditions in circuit 23 are such as normally to tend to produce excessive current the current limit feature of our invention comes into play and the contact 13 vibrates into and out of engagement with the contact 12, which then remains stationary due to the fact that the average voltage of the circuit will then be less than the normal value, as a result of the operation of the current limit feature.

In the modification shown in Fig. 2 the only essential difference from Fig. 1 is that member 17 is directly electromagnetically actuated instead of being indirectly operated through a mechanical connection with armature 7. As shown in Fig. 2, the magnetic circuit 3 is so arranged that it can attract both the armatures 17 and 7 directly. Consequently, the latch member 20 and the resilient mounting for the contact 9 may be dispensed with in Fig. 2.

The operation of Fig. 2 is essentially the same as the operation of Fig. 1 and the contact 8 engages the contact 9 when the total energization of the magnetic circuit 3 exceeds a predetermined minimum value and the armature 17 is attracted to the magnetic circuit, whereby the contact 13 leaves the contact 12 whenever the total magnetization of the magnetic circuit 3 exceeds a predetermined maximum value.

While we have shown and described particular embodiments of our invention, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a pair of electromagnets, a separate potential winding on each magnet, a current winding on one magnet, a pair of separably biased cooperating contacts adapted to be engaged when the pull of the magnet with the current winding exceeds a predetermined minimum value, and a pair of movable cooperating contacts individually biased toward each other, one of said last mentioned contacts being arranged to be moved away from the other when the pull of the magnet with the current winding exceeds a predetermined maximum value, the other of said last mentioned contacts being arranged to be moved away from its cooperating contact when the pull of the other magnet exceeds a predetermined value.

2. A combined current-limited voltage regulator and cut-out comprising, in combination, a unitary magnetic structure having two magnetic circuits, a separate potential winding on each circuit, a current winding on one circuit, a pair of engageable contacts biased to a separated position, means including the magnetic circuit having the current winding for causing engagement of said contacts when the total flux in said circuit exceeds a predetermined minimum value, another pair of engageable contacts each of which is separately biased towards the other, means including the magnetic circuit having the current winding for causing one of the last mentioned contacts to leave the other when the flux in said circuit exceeds a predetermined maximum value, and means including the other magnetic circuit for causing the other of said last mentioned contacts to leave the first when the flux in said other circuit exceeds a predetermined value.

3. In combination, a direct current generator, a shunt field winding therefor, a regulating resistance in series therewith, a storage battery, and a combined current-limited voltage regulator and cut-out for said generator comprising a pair of magnetic circuits, a pair of contacts adapted to be closed when the magnetization of one of said circuits exceeds a predetermined minimum value, a current winding on said circuit, an electric circuit including said generator, said winding, said contacts and said battery in series, a separate potential winding on each of said magnetic circuits connected to respond to the voltage of said electric circuit, the potential winding and the current winding on the same circuit being arranged to act cumulatively when charging current flows from said generator to said battery, a pair of cooperable contacts each of which is biased toward the other, said contacts being connected across said regulating resistance, and separate means responsive, respectively, to the magnetization of each magnetic circuit for moving a different one of said last mentioned contacts away from the other.

4. In combination, a unitary magnetic structure having two separate magnetic circuits, a separate potential winding on each circuit, a current winding on one circuit, a pair of engageable movable contacts each of which is biased toward the other, one of said contacts being more strongly biased than the other, a stop for limiting the motion of the stronger biased contact toward the other, a resiliently mounted contact, a movably mounted contact for cooperation therewith, means including the magnetic circuit having the current winding for causing said movable contact to engage said resiliently mounted contact when the total flux in said one circuit exceeds a predetermined minimum value, said means being arranged to move said contacts together a predetermined distance when the total flux in said circuit exceeds a predetermined maximum value, means responsive to said predetermined movement for moving the stronger biased of the first mentioned contacts away from the weaker biased one, and means including the other magnetic circuit for moving the weaker biased contact away from the stronger biased one when the flux in said other circuit exceeds a predetermined maximum value.

5. In combination, a unitary magnetic structure having two separate magnetic circuits, a separate potential winding on each circuit, a current winding on one circuit, a pair of contacts biased to a separated position, means including the magnetic circuit having the current winding and an armature for causing engagement of said contacts when the magnetization of said one circuit exceeds a predetermined minimum value, a second pair of engageable movable contacts individually biased toward each other, one of said contacts having a stronger bias than the other, a stop for limiting the motion of the stronger biased contact toward the other, means including the magnetic circuit having the current winding and a second armature for moving the stronger biased contact away from the other when the magnetization of said circuit exceeds a predetermined maximum value, and means including the other magnetic circuit for moving the weaker biased contact away from the stronger biased one when the magnetization of said other circuit exceeds a predetermined maximum value.

LOUIS W. THOMPSON.
BERNARD M. CAIN.